(12) United States Patent
Yang et al.

(10) Patent No.: US 6,215,584 B1
(45) Date of Patent: Apr. 10, 2001

(54) INPUT INDEPENDENT TILT FREE ACTIVELY GAIN FLATTENED BROADBAND AMPLIFIER

(75) Inventors: Dan Dan Yang, Gatineau; Marc M. Dignam, Thunder Bay, both of (CA)

(73) Assignee: JDS Uniphase Inc., Nepean, Ontario (CA)

( * ) Notice: Subject to any disclaimer, the term of this patent is extended or adjusted under 35 U.S.C. 154(b) by 0 days.

(21) Appl. No.: 09/307,704

(22) Filed: May 10, 1999

(51) Int. Cl.$^7$ ...................................................... H01S 03/00
(52) U.S. Cl. ............................................. 359/341; 359/124
(58) Field of Search ...................................... 359/341, 124

(56) References Cited

U.S. PATENT DOCUMENTS

| | | |
|---|---|---|
| 5,664,131 | 9/1997 | Sugiya . |
| 5,812,710 | 9/1998 | Sugaya . |
| 6,055,092 * | 4/2000 | Sugaya et al. ........................ 359/337 |
| 6,055,094 * | 4/2000 | Shima et al. ........................ 359/341 |
| 6,061,171 * | 5/2000 | Taylor et al. ........................ 359/341 |
| 6,108,123 * | 8/2000 | Kinoshita ............................ 359/337 |

FOREIGN PATENT DOCUMENTS

| | | | |
|---|---|---|---|
| 0 805 571 | 11/1997 | (EP) | ................................ H04J/14/02 |
| 9-219696 | 8/1997 | (JP) | ................................ H04J/14/00 |

* cited by examiner

*Primary Examiner*—Mark Hellner
(74) *Attorney, Agent, or Firm*—Neil Teitelbaum

(57) ABSTRACT

A broadband optical amplifier that can provide a constant amplifier gain profile, correct for ASE noise, and minimize gain tilt by dynamically controlling different stages of the amplifier through a combination of gain, loss, and power control of each stage depending on input and the desired output level. The multiple stage amplifier has a central control circuit independently controlling each stage, the amplifier comprising a plurality of sequentially coupled stages, each stage being an attenuator stage, a gain setting sub-amplifier stage, or a power level setting stage. The central control circuit determines which stages are actively gain or power controlled.

20 Claims, 4 Drawing Sheets

INPUT INDEPENDENT TILT FREE ACTIVELY GAIN FLATTENED BROADBAND AMPLIFIER

FIELD OF THE INVENTION

This invention relates to gain flattened broadband optical amplifiers and more particularly to fiber amplifiers used for multi-channel Dense Wavelength Division Multiplexing (DWDM) based light wave communications systems and networks.

BACKGROUND OF THE INVENTION

Optical amplifiers, in particular Erbium doped fiber based amplifiers (EDFAs) are now the most commonly used optical amplification devices to amplify weakened optical signals. These are used by network elements such as Add/Drop multiplexers, optical cross-connects, switches, and routers. Largely used for both short and long haul optical communication networks, they can also be used for CATV broadcasting. The newest wavelength division multiplexing (WDM) systems, with all optical channels carried simultaneously by the same fiber as different wavelengths of light, require even more uses of EDFAs. This is primarily because the presence of multiple wavelengths, with each wavelength as a separate channel, offers great data carrying capacity. Not only that, but the use of multiple wavelengths on a single fiber also offers a flexibility for network planning and data/voice traffic routing.

The conventional EDFA bandwidth has been extended recently from the standard 1525–1565 nm area to the new 1565–1605 nm band (see U.S. Pat. No. 6,104,527 issued Aug. 15, 2000 to Dan Yang). More bandwidth is therefore now available, giving rise to more channels. This allows optical networks to transport information at rates of up to a terabit per second.

The physics of Erbium doped fiber is such that signal amplification or gain varies, depending on signal wavelength. Because of this, feeding several wavelengths of light into an amplifier, with each wavelength representing a separate channel, can produce problems. Since each channel is transmitted as a separate wavelength, and since gain is dependent on wavelength, different channels receive different amplifications. As consequence, the output of optical amplifiers used in multi-channel transmission systems must always be gain flattened. Gain flattening is accomplished by using gain flattening filters such as fiber gratings or by choosing more naturally flat Erbium fiber. Regardless of the gain flattening method used, the configuration of the passively gain flattening device of optical amplifiers is well defined for a given total input signal power and does not change once the amplifier package is closed. A passively gain flattened amplifier is therefore always designed for a specific gain and input power. For each specific gain and input power, the amplifier gain profile is constant. It must be noted that during amplifier operation the amplifier gain is locked to a constant value for most of WDM operation.

Given the above, another problem arises when the total amplifier input level changes. This condition can occur when the channel load varies due to events such as the dropping of channels at a node or the adding of channels at a junction. When this condition occurs, the pump power of the amplifier has to be adjusted in order to keep the gain constant. This is done to keep the amplifier gain profile unchanged. This method is suitable for applications such as changing the number of channels with each channel having a constant power level. By adjusting the pump power to keep the amplifier gain constant, each channel will be amplified evenly no matter how many channels are loaded. An apparatus for accomplishing this is disclosed in U.S. patent application Ser. No. 09/282206 filed Mar. 31, 1999.

Unfortunately, the invention contained in the above noted application has a shortcoming that renders it unsuitable for some applications. Specifically, it cannot maintain the amplifier gain profile when channel load remains the same but channel power varies. This condition normally occurs in instances such as a wave division multiplexed (WDM)ring configuration where all or some of the channels may be replaced at a node.

For applications such as the above, locking the amplifier gain to a constant is no longer practical. Locking the gain to a specific value produces a small output signal when the input signal is small. This is due to gain being the ratio between output and input. If this ratio is fixed, then having a small input produces a small output. Similarly, a large input will produce a large output for a fixed gain. This relation causes difficulty in optical system design as transmission fiber loss, or the link loss, is always constant. Thus, if a channel output is low, it may not be strong enough to reach the receiver.

To possibly solve this, it is possible to not lock the gain to a specific value. In this case, if gain is not locked, pump power is not adjusted depending on input. Amplifier output may remain about the same especially if the amplifier is working in deep saturation regime. However, because input level has changed, gain (or atomic level population inversion) becomes different from the designed (and optimized) one. The gain profile which was originally corrected by an embedded filter or some other method may be destroyed. This can cause a large gain variation across the wavelengths, with some wavelengths being amplified more than others and with some wavelengths having more amplified power than others. As a result, some channels reach the receiver while others may become too weak to be detected. This phenomenon is known as amplifier gain tilt. FIG. 1 shows this occurring. As can be seen from the plot, the gain is and the gain flatness is dependent on the input signal level.

To solve the amplifier gain tilt problem, there are known amplifiers that have a specific characteristic. These amplifiers have a small input dynamic range within which the gain profile can remain unchanged if pump power is not adjusted. However, this small input dynamic range limits the use of such amplifiers. What is needed is an optical amplifier that not only has a large input dynamic range but also minimizes the gain tilt effect. Such an amplifier must respond evenly to different input levels without changing the output gain response profile. This amplifier must also allow the user to control the output signal power level without worrying about gain tilt.

To accomplish all of the above, the amplifier must be actively gain controlled. For active gain control, the gain flattening device must be adjusted for each new input/output power condition.

Pursuant to the above need, two active gain flatness control methods have been suggested. These use either actively controlled acousto-optic filters or a combination of optical switches and gain flattening filters, with each switch/filter combination corresponding to a different required gain. Both methods use different gain flattening filter profiles for each new signal and/or amplified spontaneous emission (ASE) condition. Given that the Erbium fiber gain spectrum has a complex shape, the acousto-optic method requires using several acousto-optic filters. Such a method is clearly expensive. Furthermore, each acousto-optic filter requires complex RF electronics and specialized programs for control, as well as a complex feedback mechanism to adjust and optimize the combination. Also, the large insertion loss of acousto-optic devices prevent them from being used outside of research labs.

The second method, using active gain flatness control, consists of using two optical switches, one at the input and one at the output, in conjunction with a number of gain flattening filters in parallel. Each time the control circuit detects an input level, it compares the input level with a preprogrammed table and switches to the corresponding gain flattening filter. This method, unfortunately, has some shortcomings. Specifically, it lacks flexibility in that for N filters have to be put in place. If N is a large number, this can be very costly.

Accordingly, what is required is an optical amplifier with a large dynamic input that provides a user adjustable power output while providing a constant gain profile, thereby preserving the gain dependence on signal wavelength. Further, this optical amplifier must also eliminate or at least minimize the gain tilt phenomenon to provide a constant gain profile regardless of input level or the number of channels.

SUMMARY OF THE INVENTION

The present invention overcomes the deficiencies identified in the prior art by providing a broadband optical amplifier that can provide a constant amplifier gain profile, correct for ASE noise, and minimize gain tilt by dynamically controlling different stages of the amplifier through a combination of gain, loss, and power control of each stage depending on input and the desired output level.

The present invention provides a broadband optical amplifier having an input and an output, said amplifier comprising a programmable control circuit, a first optical sub-amplifier having an adjustable gain setting controlled by the control circuit and producing an intermediate optical signal, a second optical sub-amplifier having an adjustable pump power setting controlled by the control circuit and producing an output optical signal, an optical signal attenuator having a variable attenuation setting controlled by the control circuit and producing an attenuator output signal, a first optical signal sampling device which samples an input optical signal, a second optical signal sampling device which samples the intermediate optical signal, a third optical signal sampling device which samples the attenuator output optical signal wherein the first optical sub-amplifier is coupled between the first sampling device and the second sampling device, the optical signal attenuator is coupled between the second and the third sampling devices, the second optical sub-amplifier is coupled to the third sampling device, each sampling device is further coupled to the control circuit, the control circuit controls each optical sub-amplifier and the optical attenuator based on sampling input from the sampling devices.

Preferably, said control circuit controls the adjustable gain setting of said first sub-amplifier based on a ratio between the input optical signal and the intermediate optical signal.

More preferably, said control circuit further includes a calculation circuit for calculating an actual amplifier gain by subtracting a gain factor relating to amplified spontaneous emission (ASE) noise from the adjustable gain setting.

Most preferably, the control circuit adjusts the variable attenuation setting based on a power level of the input optical signal.

Conveniently, the control circuit adjusts the variable attenuation setting from a predetermined value to a setting determined by the sum of the predetermined value and an attenuation factor.

More conveniently, the control circuit further includes a calculation circuit for calculating the attenuation factor based on a predetermined reference power level and the power level of the input optical signal.

Also conveniently, the attenuation factor is stored in a memory of the control circuit.

Most conveniently, the control circuit adjusts the variable attenuation setting based on a comparison of the power level of the input optical signal and a power level of the attenuator output optical signal.

In another emobodiment of the invention, there is provided a multiple stage broadband optical amplifier comprising a central control circuit, a first stage for receiving an input optical signal and for providing a constant gain profile to an intermediate optical signal output, a second stage for producing a signal with a set power level regardless of a power level of the intermediate optical signal output from the first stage, a third stage for providing power control to a signal output from the second stage and a plurality of sampling couplers coupled between the stages wherein each stage is coupled to the central control circuit, each stage is independently controlled by the central control circuit, and each sampling coupler is further coupled to the control circuit.

Preferably, the first stage includes an optical sub-amplifier having an adjustable gain setting controlled by the central control circuit.

Also preferably, the second stage includes an optical signal attenuator with a variable attenuation setting controlled by the second control circuit.

More preferably, the third stage includes an optical power sub-amplifier having an adjustable pump power setting controlled by the central control circuit.

Most preferably, the amplifier further includes multiple stages for providing further gain control.

Also preferably, the amplifier further includes multiple stages for providing further output power control.

In yet another embodiment of the invention, there is provided a method of amplifying an optical signal comprising:

a) feeding the optical signal to at least one optical sub-amplifier to provide a constant gain profile b) feeding the optical signal to at least one optical signal attenuator to provide an output signal with a predetermined power level regardless of a power level of the optical signal c) feeding the optical signal through at least one power level optical sub-amplifier to set an output power level to a desired power level.

A further embodiment of the invention provides a multiple step method of amplifying an optical signal wherein the first step comprises:

passing the optical signal through an optical sub-amplifier that provides a constant gain profile and outputs an intermediate optical signal and the second step comprises:

passing the intermediate optical signal through a variable optical attenuator that produces an attenuator output signal with a predetermined power level the third step comprises:

passing the attenuator output signal through an optical power sub-amplifier that sets an output power level to a desired power level.

Conveniently, the first step further includes a) passing an optical signal through an optical sub-amplifier having an adjustable gain set to a desired gain to produce the intermediate optical signal b) detecting the intermediate optical signal from the optical sub-amplifier c) correcting the adjustable gain to correct for noise level.

More conveniently, the second step further includes:

i) feeding the intermediate optical signal to an optical attenuator to attenuate said optical signal to produce the attenuator output signal ii) determining an attenuation factor based on a power level of the intermediate optical signal iii) adjusting the variable attenuation based on the attenuation factor.

Even more conveniently, step ii) further includes calculating the attenuation factor based further on the noise level and a predetermined reference power level.

Most conveniently, step ii) further includes adjusting the variable attenuation based on a comparison of the power level of the intermediate optical signal and a power level of an output optical signal.

Preferably, the third step further includes:

i) feeding the attenuator output signal to an optical power sub-amplifier having a controllable pump power setting to produce an output signal ii) determining a desired power level based on a program contained in a control circuit iii) adjusting the pump power level based on the desired power level.

Another embodiment of the invention provides a method of amplifying an input optical signal to produce an output signal with a desired characteristic, said method comprising:

feeding the input optical signal into a multiple stage optical amplifier having a central control circuit and a plurality of sequentially coupled stages having the central control circuit determine which stages in the multiple stage optical amplifier are required to be active based on the input optical signal, a program contained in the central control circuit, and the desired characteristic transmitting separate control signals to each stage in the multiple stage optical amplifier, said control signals being based on a determination of which stages are required to be active sequentially receiving the input optical signal in each of the stages of the multiple stage optical amplifier modifying the characteristics of the input optical signal in each of the stages of the multiple stage optical amplifier based on the control signals sent from the central control circuit transmitting the output optical signal with the desired characteristic to an output of the multiple stage optical amplifier.

Another alternative embodiment of the invention provides a multiple stage broadband optical amplifier including a control circuit, at least one attenuator stage coupled to the control circuit, and at least two sub-amplifier stages, each sub-amplifier stage coupled to the control circuit wherein each stage is independently controlled by the control circuit.

Conveniently, each attenuator stage includes an optical signal attenuator having a variable attenuation setting controlled by the control circuit, a first attenuator stage optical signal sampling device coupled to the signal attenuator and the control circuit, a second attenuator stage optical signal sampling device coupled to the signal attenuator and the control circuit and wherein the optical signal attenuator is coupled between the first and the second attenuator stage sampling devices, the control circuit controls the variable attenuation of the signal attenuator based on input from the first and second attenuator stage sampling devices and a programmed value.

Also conveniently, each sub-amplifier stage includes an optical signal sub-amplifier having an adjustable setting controlled by the control circuit, a first sub-amplifier stage optical signal sampling device coupled to the signal sub-amplifier and the control circuit, and a second sub-amplifier stage optical signal sampling device coupled to the signal sub-amplifier and the control circuit wherein the signal sub-amplifier is coupled between the first and the second sub-amplifier stage sampling devices, and the control circuit controls the adjustable setting based on input from the sub-amplifier stage sampling devices and a programmed value.

Preferably, a first attenuator stage is coupled between a sub-amplifier stage receiving an input signal and a sub-amplifier stage producing an output signal.

More preferably, the amplifier further includes a second attenuator stage coupled at the output of the sub-amplifier stage producing an output signal.

Another embodiment of the invention provides a multiple stage broadband optical amplifier having a central control circuit independently controlling each stage, the amplifier comprising a plurality of sequentially coupled stages with each stage being chosen from the group comprising of:

attenuator stages, gain setting sub-amplifier stages, and power level setting stages wherein the central control circuit determines which stages are actively gain or power controlled.

Preferably, each attenuator stage includes an optical signal attenuator having a variable attenuation setting controlled by the central control circuit.

More preferably, each gain setting sub-amplifier stage includes an optical signal gain sub-amplifier having an adjustable gain setting controlled by the central control circuit.

Most preferably, each power setting sub-amplifier stage includes an optical signal power sub-amplifier having an adjustable pump power setting controlled by the central control circuit.

Conveniently, the central control circuit determines and changes according to the embedded program the control pattern for each sub-amplifier depending on different input situations and output requirements.

The advantages of this invention are clear. The flexibility of the configuration of the amplifier gives an amplifier that can be programmed to output a signal that is not only independent of the input power level but a signal that has a desired characteristic. Also, the gain tilt problem is reduced, if not eliminated by the equalization of signal power between the different channels in the input signal. What the invention provides is a very flexible solution to the above noted problems. Gain tilt is reduced, the gain response is kept constant, and output power levels can be set to a desired value.

BRIEF DESCRIPTION OF THE DRAWINGS

A better understanding of the invention may be obtained by reading the detailed description of the invention below, in conjunction with the following drawings, in which.

DETAILED DESCRIPTION OF THE INVENTION

Figure 2:
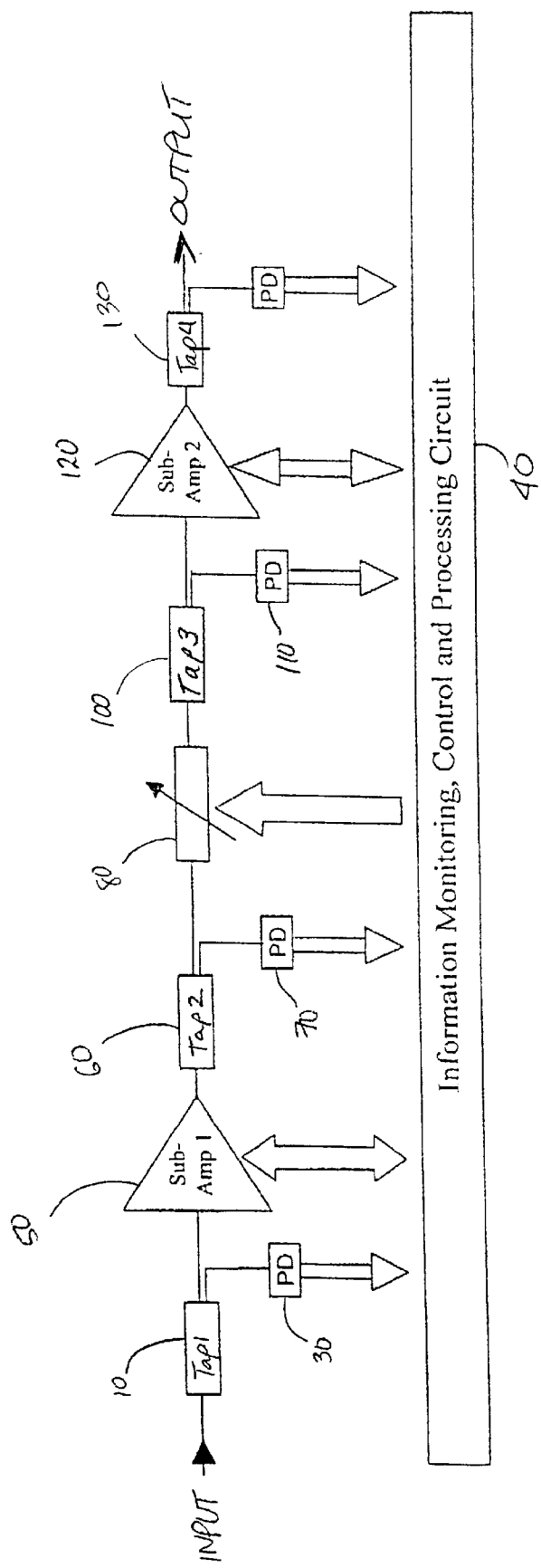
FIG. 2 is a schematic diagram of a tilt free controllable output amplifier module according to the invention.

In order for the amplifier to handle highly variable input signals while providing exactly the same output profile with a desired signal output power level for each input, a novel amplifier structure is disclosed in FIG. 2. Compared with standard amplifier control processes, this amplifier requires separate control for each sub-amplifier section. This novel amplifier provides a mixture of gain and power control for each sub-amplifier section to achieve gain tilt free performance.

The amplifier is separated into two or more sub-amplifier sections, each section containing at least one active gain medium. Each section requires individual control and normally needs at least one independent pump laser to be adjusted for gain control for the section. Each sub-amplifier section can have its own passive component contents. The sub-amplifier output may have already been passively gain flattened.

The first sub-amplifier section is locked to a constant gain by electronically controlling its pump laser. This will provide accurate gain control regardless of the input level. Regardless of how much total or per channel input level the amplifier receives, this sub-amplifier section provides a gain that is kept constant by continuous adjustment of the pumping power of the pump laser. Such a continuous adjustment can be done by adding a tap coupler at both the output and the input of the sub-amplifier section. A microprocessor can be used to sense both input and output levels of this sub-amplifier section. Based on the levels detected, the power of the pump laser is continuously adjusted to provide an output that has a constant gain relative to the input.

When the gain is locked by adjusting the pump power, the output gain profile of this sub-amplifier section remains constant but the output level changes. Locking the output gain of the first sub-amplifier to a constant provides an identical gain profile for all input levels, thereby preserving the wavelength dependence of gain.

To further modify the signal, an electronically controllable variable attenuator is added at the output of the sub-amplifier section. This attenuator increases its attenuation setting when the output level increases and decreases its attenuation setting when input level decreases. The net effect of this is power equalization for the output of the sub-amplifier section. The variable attenuator therefore equalizes downstream power levels, providing any following sub-amplifiers a signal that has both a constant gain profile and a constant power level. The attenuator is placed at the output of the first sub-amplifier section and not at its input because the signal-to-noise ratio will not be affected by the attenuation of the signal. This is because the signal-to-noise degradation for the whole amplifier is mostly determined by the first sub-amplifier section.

After the attenuator, other sub-amplifiers and/or gain flattening devices can be inserted. Whatever components or component combinations are used, the output of the final amplifier has a constant gain profile as the following sub-amplifier sections receive signals with the same characteristics in terms of power and wavelength dependence of gain. The remaining sub-amplifiers will be configured to a fixed pump power mode independent of amplifier input situation. This will provide as much as output power as possible for each channel. A final variable attenuator can be added at the final output of the amplifier. This final attenuator can be adjusted if a lower power level is desired.

Referring to FIG. 2, the workings of the novel amplifier topography will be examined. A signal is first fed into the amplifier input. The first tap coupler 10 (Tap1) senses the amplitude of this input and sends this information to a sub-control circuit 20 via photo-detector 30. The sub-control circuit 20 is in communication with the central control circuit 40.

The sub-control circuit 20 adjusts the pumping power of the pump laser contained in sub-amplifier 50 to achieve the desired gain. For accurate gain control, an offset or a gain factor for amplified spontaneous emission (ASE) has to be taken into account. This is because the output of the sub-amplifier 50, the intermediate output signal as it is not the final output, is the sum of the output signal plus the ASE gain factor. The ASE gain factor can be determined quite accurately according to the equation $$\text{Gain factor} = 10 * \log(1 + A/(G * Pin)),$$

where

G is the amplifier gain in linear scale

A is the ASE power in linear scale with the gain locked at G, and

Pin is the power of the input signal in linear scale.

Of these variables, G is constant as it is desired to lock the amplifier gain. However, Pin is variable, making the gain factor dependent on input power. G is further defined as the ratio of the total sub-amplifier output signal level to the total sub-amplifier input signal level.

ASE power A can be considered as constant and given by $$A = (hv_o/2) * NF * G * Bp$$

where $hv_o$ is photon energy which is relatively constant within the 1.5 μm amplifier window, NF is the amplifier noise figure and can be considered approximately constant for gain locked amplifier, G is the constant amplifier gain, Bp is amplifier bandwidth and is also constant.

From the above, as long as amplifier gain is fixed, ASE power is approximately constant regardless of the input level.

The ASE gain factor for gain control can be accurately determined once input level is known. For example, for an amplifier with gain locked at 23 dB, using the above formula of ASE calculation, the total ASE power is 0.5 mW regardless of the input. So when input is 100 μW, the gain factor should be 0.1 dB. If input is 1 μW, this gain factor becomes 5.5 dB. This means that, in order to have a signal gain of 23 dB, pump power must be adjusted to provide a total output of −1.5 dB. This figure includes the signal, gain, and the gain factor, all in dB. The output is measured by the tap coupler 60 (Tap2) through the photo-detector 70.

From the above, it can be seen how the output gain is fixed to a constant. The signal is fed into the tap coupler 10 (Tap1). The tap coupler 10 feeds the signal characteristics such as input level and power to the control circuit 40 via the photo-detector 30. The tap coupler also feeds the signal to the sub-amplifier 50 that has a pump laser. The output of the sub-amplifier 50, the intermediate optical signal, is then detected by the tap coupler 60 (Tap2). The tap coupler 60 (Tap2) then feeds the characteristics of the intermediate optical signal back into the control circuit 40 via the photo-detector 70. The control circuit 40 determines the corrected gain setting, taking into account the ASE noise. The ASE noise power is then calculated using the above formulas and the gain factor is then factored into the calculation to determine the correct gain setting required to give the desired gain. Based on this calculation, the control circuit 40 then controls the pump power of the laser in the sub-amplifier 50 to the proper setting. This effectively changes the gain of the sub-amplifier to a gain setting that is corrected for ASE noise.

Gain is thus properly set using power received by the tap coupler 60 (Tap2) in comparison with the power detected by the tap coupler 10 (Tap1). Such a comparison is made while taking into account the gain factor described above. The gain factor can be calculated each time by the central control circuit 40. Alternatively, a look-up table stored in the memory of either control circuit can be used. Such a table would contain precalculated gain factors for given power levels. Regardless of how the gain factor is obtained, a proper setting for the pump power of the sub-amplifier 50 is determined and the appropriate control command sent.

Again with reference to FIG. 2, after the sub-amplifier section comes a programmable attenuator 80. This attenuator 80 is fed by the tap coupler 60 (Tap2). The attenuator 80 is connected to the control circuit 40. The control circuit 40 is also fed by the photodetector 70 with the characteristics of the intermediate optical signal, the output signal of the sub-amplifier 50. The attenuator output is fed into a third tap coupler 100 (Tap3). This tap coupler 100 (Tap3) feeds the characteristics of the attenuator output to the control circuit 40 via the photo-detector 110.

The workings of this second stage of the amplifier can now be examined. According to the power received by the tap coupler 10 (Tap1), the control circuit 40 adjusts the setting of the programmable attenuator 80. Total attenuation is calculated by the central control circuit 40 using power data from the two tap couplers 10,100 that are connected to the central control circuit 40. An attenuation factor must be taken into account when determining the desired attenuation that the attenuator 80 must provide. This is due to the ASE content in the output from the sub-amplifier 50. The change in attenuation required, also known as the attenuation factor, can be calculated according to the following formula:

$$\Delta att=10*\log(P_1/P_0)+10*\log(1+A/(P_0*G))-10*\log(1+A/(P_1*G))$$

where
  $\Delta att$ is the attenuation change required compared to a reference attenuation (such as 0) in dB
  $P_0$ (in linear scale) is the input level of sub-amplifier 50 (thus input level for the entire amplifier) sensed by the tap coupler 10 (Tap1) when attenuation is at a reference value such as 0
  $P_1$ (in linear scale) is the power level of the input signal of the sub-amplifier 50 detected by the tap coupler 10 (Tap1) in linear scale
  A (in linear scale), as defined previously, is total the ASE power at sub-amplifier 50 output
  G is the amplifier gain for sub-amplifier 50 locked at a constant in linear scale Of the above formula elements, only $P_1$ is truly variable. $P_0$ is a reference value that is predetermined and prepro-grammed into the control circuits. A, as discussed previously, is constant, along with the constant output gain G.

The above formula can be simplified under specific circumstances. For example, if the power level detected by the tap coupler 10 (Tap1) is high and the output of sub-amplifier 50 does not contain a high ASE content, $P_1*G$ is much greater than A. Thus, the above formula can be simplified to $\Delta att=10*\log(P_1/P_0)$ If, on the other hand, the power of the input signal is low with ASE constituting a large portion of the sub-amplifier 50 output, the attenuation factor should be calculated according to the more complicated formula above. In this case, even though the final signal output changes slightly with the change in the input power due to the ASE content generated by the sub-amplifier 50, the wavelength dependence of gain still remains constant. Thus, tilt free amplifier performance is preserved.

The attenuation factor can be calculated in real-time the central control circuit 40. Alternatively, a look-up table stored in the control circuit 40 can be used. Such a table would contain specific attenuation factors for specific power levels.

Any change in attenuation caused by the attenuation factor effectively tracks any change in the power of the input signal. Because of the attenuation provided by the attenuator 80, the signal output received by any following sub-amplifiers will remain constant. This results in an amplifier with a final output that is not only tilt free but also has a constant signal output regardless of the input if the input is high enough to saturate the whole amplifier.

To determine if the desired attenuation is being achieved, the third coupler 100 (Tap3), provides a control loop.

As can be seen, the role of the attenuator is to ensure that the total input power to the second sub-amplifier 120 is constant and independent of the input power to the amplifier as a whole. This ensures that the saturation, and hence the gain characteristics of the second sub-amplifier 120 is the same for all input power levels. There are two possible ways in which this can be achieved.

The first method is to use the power out of coupler 100 (Tap3)as measured by photo-detector 110, as a feedback on the attenuator 80 to give the same power out of the attenuator 80 for all input power levels as is found in the case where the input power level is at the minimum expected power. Such a minimum power level can be the level represented by $P_0$ in the above example.

A second method is to include in the control circuit 40 a calculation of the attenuation factor as a function of the input total signal level and the minimum expected input signal level $P_0$. The attenuation factor is then determined by the equations given above.

After the attenuator stage, a power level stage is inserted. The third coupler 100 is used for the input sensing of a next sub-amplifier 120. This would be useful if the next sub-amplifier 120 is required to have gain control. However, it is preferable that the sub-amplifier 120 be used to set the power level of the output signal. Depending on the program contained in the control circuit 40, the final output power of the amplifier can be set by the sub-amplifier 120. If a large output signal is desired, the pump power of the sub-amplifier 120 can be set accordingly. If, on the other hand, a smaller power output is desired, the power setting of the sub-amplifier 120 can be set lower by the control circuit 40. To help control the sub-amplifier 120, another coupler 130 (Tap4) is used. The couplers Tap3 and Tap4, 100, 130, provide a control loop to properly control the output of the second sub-amplifier 120.

Figure 3:
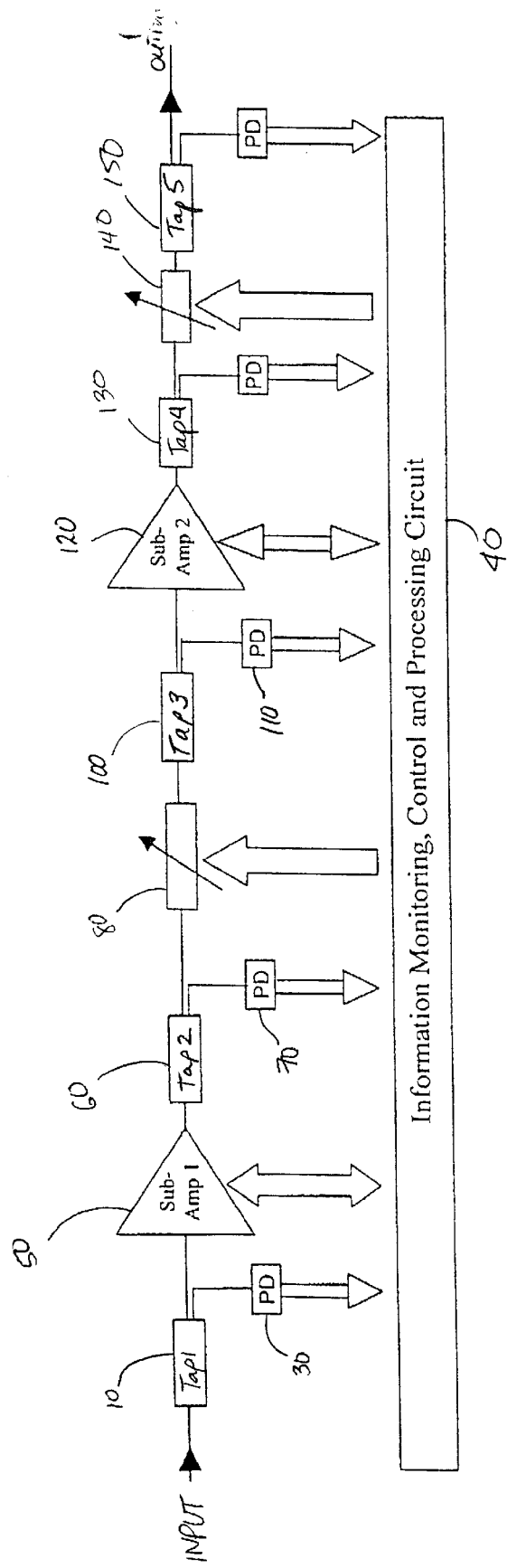
FIG. 3 is a schematic diagram of the invention with a further amplifier element added.

Alternatively, as shown in FIG. 3, if the output power desired is lower than the what the sub-amplifier 120 can provide, a second attenuator 140 can be inserted after the sub-amplifier 120. This second attenuator 140 is also controlled by the control circuit 40 and can attenuate the output signal to the desired level. The tap couplers 130,150 Tap4 and Tap5 can be used to determine if the outputs of the sub-amplifiers 120 and the second attenuator 140 are at the desired levels.

It must be noted that the tap couplers mentioned above can be a combination of photo-detectors optically coupled to optical couplers.

In another alternative, a gain flattening filter can be inserted within the amplifier after the attenuator 80 or after the coupler 100. The filter can be before the second sub-amplifier 120 or within the second sub-amplifier 120. This configuration is not shown in FIG. 3. In such a configuration, with a gain flattening filter inserted after the attenuator, only one gain flattening filter is required because of the constant gain profile and equalized power output. No adjustment of the filter is needed.

As can be seen from FIG. 3, further sub-amplifier stages can be used after the sub-amplifier 120. Such stages can contain gain flattening filters, further attenuators, or further sub-amplifiers. However, regardless of the stages added to the amplifier, only one set of filters are required for any input level as the filter always receives a signal with a constant gain profile and power level. Each of these stages can be independently controlled by the control circuit to provide a desired output characteristic.

With respect to the control circuit, it can be a microprocessor with an embedded program that provides specific instructions to the different stages depending on signal conditions detected by the optical couplers and photo-detectors. Alternatively, the control circuit can be user programmable to provide flexibility in responding to changing network conditions. Depending on the program controlling the control circuit, its instructions to the different stages can vary. It can command a sub-amplifier stage to increase its pump power output or to lock its gain setting to a specific value. Alternatively, the control circuit can also command an attenuator stage to increase or decrease its attenuation to provide a specific output signal characteristic. Also, the control circuit might command a sub-amplifier stage to lock its gain or power output such that the sub-amplifier becomes a repeater element in the amplifier. In sum, the control circuit is flexible enough to control each and every stage to provide the proper configuration for the amplifier to output the desired signal characteristic.

The centrally controlled multiple stage amplifier outlined above can also be used in such a manner that each stage of the amplifier, be it an attenuator stage or a sub-amplifier stage controlling either gain or power, can be made active by the central control circuit. By active, what is meant is for the stage to have a signal modifying characteristic and not simply be a lossless and gainless signal repeater within the amplifier. Thus, if an amplifier had seven stages, each of the stages can be configured by the central control circuit differently. Some stages can be configured to provide only a gain of unity if required or, if it is an attenuation stage, to provide no attenuation if none is required. This amplifier would therefore have an unprecedented flexibility in providing whatever signal modifications are required.

Figure 4:
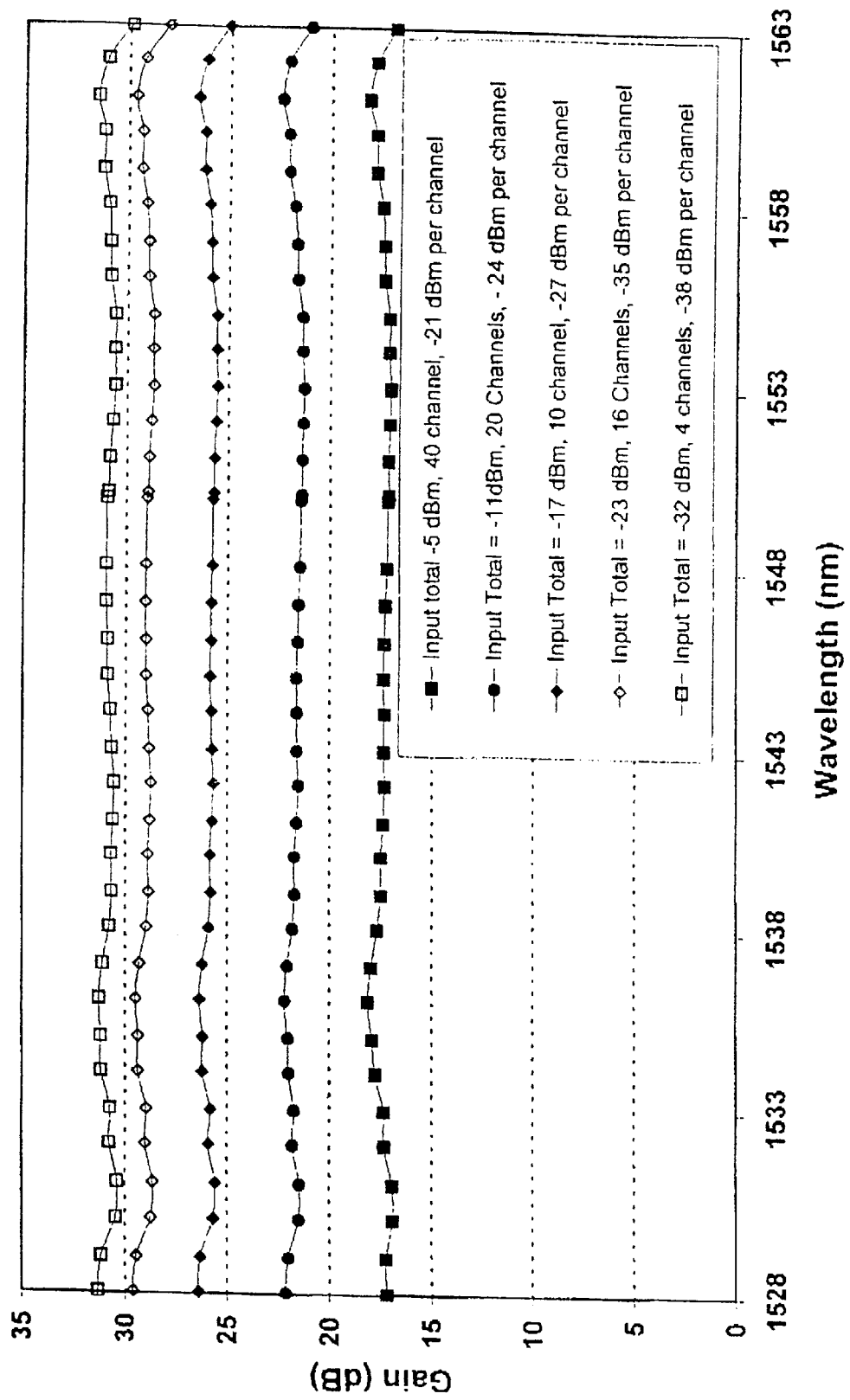
FIG. 4 is a plot showing the performance of an amplifier according to the invention.

FIG. 4 shows a plot of the performance of a tilt free amplifier with different inputs. As can be seen from the plot and the legend included, neither the number of channels nor the input level of each channel changes the gain response of the amplifier. The gain dependence on wavelength is independent of not only the signal wavelength but also of the signal power level.

Figure 1:
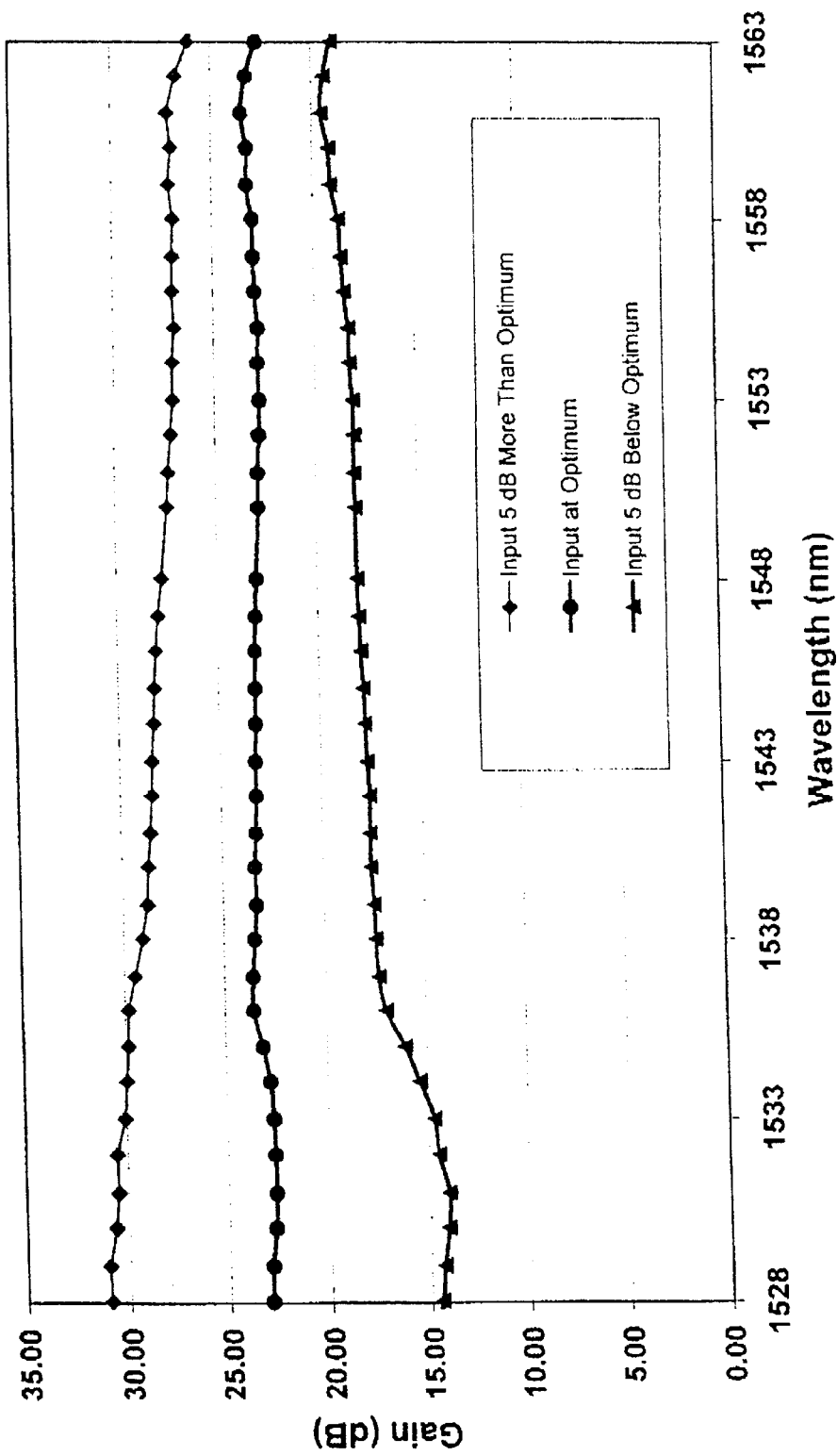
FIG. 1 is a plot showing the effect of gain tilt.

While the plots shown in FIGS. 1 and 4 are show a wavelength range of 1525 to 1565 nm (the standard EDFA band), this invention can be applied to the Extended Band (1565 to 1605 nm) or to any other amplifier that requires gain flattening.

A person understanding this invention may now conceive of alternative structures and embodiments or variations of the above all of which are intended to fall within the scope of the invention as defined in the claims that follow.

We claim:

1. A multiple stage broadband optical amplifier providing a variable amount of amplification to a variable input optical signal resulting in an output optical signal, having a desired power level and a substantially constant gain profile, comprising:

a central control circuit;

a first stage for receiving an input optical signal and for providing a constant gain profile to an intermediate optical signal outputs;

a second stage for producing a signal with a set power level, determined by said central control circuit based on the desired power level of the output signal, regardless of a power level of the intermediate optical signal output from the first stage;

a third stage for providing power control to a signal output from the second stage in response to the central control circuit, whereby the output signal will have the desired power level; and a plurality of sampling couplers coupled between the stages;

wherein each stage is coupled to the central control circuit;

wherein each stage is independently controlled by the central control circuit; and wherein each sampling coupler is further coupled to the central control circuit.

2. An optical amplifier as claimed in claim 1 wherein the first stage includes a first optical sub-amplifier having an adjustable gain setting controlled by the central control circuit.

3. An optical amplifier as claimed in claim 1 wherein the second stage includes an optical signal attenuator with a variable attenuation setting controlled by the central control circuit.

4. An optical amplifier as claimed in claim 1 wherein the third stage includes a second optical power sub-amplifier having an adjustable pump power setting controlled by the central control circuit.

5. An amplifier as claimed in claim 1 further including multiple stages for providing further gain control.

6. An amplifier as claimed in claim 1 further including multiple stages for providing further output power control.

7. An amplifier as claimed in claim 2, wherein said control circuit controls the adjustable gain setting of said first sub-amplifier based on a ratio between the input optical signal and the intermediate optical signal.

8. An amplifier as claimed in claim 7 wherein said control circuit further includes a calculation circuit for calculating an actual amplifier gain by subtracting a gain factor relating to amplified spontaneous emission (ASE) noise from the adjustable gain setting.

9. An amplifier as claimed in claim 3, wherein the control circuit adjusts the variable attenuation setting based on a power level of the input optical signal.

10. An amplifier as claimed in claim 9 wherein the control circuit adjusts the variable attenuation setting from a predetermined value to a setting determined by the sum of the predetermined value and an attenuation factor, relating to amplified spontaneous emission (ASE) noise.

11. An amplifier as claimed in claim 10 further including a calculation circuit for calculating the attenuation factor based on a predetermined reference power level and the power level of the input optical signal.

12. An amplifier as claimed in claim 10 wherein the attenuation factor is stored in a memory of the control circuit.

13. An amplifier as claimed in claim 3, wherein the control circuit adjusts the variable attenuation setting based on a comparison of the power level of the input optical signal and a power level of the attenuator output optical signal.

14. A method of amplifying a variable input optical signal to provide a variable output optical signal with a desired power level and a substantially constant gain profile comprising the steps of:
   a) feeding the optical signal to at least one optical sub-amplifier to provide a constant gain profile
   b) feeding the optical signal to at least one optical signal attenuator, controlled by a central control means, to provide an intermediate signal with a power level, predetermined by central control means based on the desired power level, regardless of a power level of the optical signal
   c) feeding the optical signal through at least one power level optical sub-amplifier controlled by the central means to set the output power level to the desired power level.

15. A method of amplifying a variable input optical signal by a variable amount to provide a output optical signal with a desired power level and a substantially constant gain profile comprising the steps of:
   1) passing the input optical signal through an optical sub-amplifier that provides a substantially constant gain profile and outputs an intermediate optical signal;
   2) passing the intermediate optical signal through a variable optical attenuator, controlled by central control means, that produces an attenuator output signal and equalizes a power level of the attenuator output signal based on the desired output power level; and
   3) passing the attenuator output signal through an optical power sub-amplifier, controlled by the central control means, that sets the output power level to the desired power level.

16. A method as claimed in claim 15 wherein the first step further includes:
   a) passing an optical signal through an optical sub-amplifier having an adjustable gain set to a desired gain by the control means to produce the intermediate optical signal
   b) detecting the intermediate optical signal from the optical sub-amplifier
   c) correcting the adjustable gain to correct for noise level.

17. A method as claimed in claim 15 wherein the second step further includes:
   i) feeding the intermediate optical signal to an optical attenuator, with a variable attenuation, to attenuate said optical signal to produce the attenuator output signal;
   ii) determining an attenuation factor based on a power level of the intermediate optical signal;
   iii) adjusting the variable attenuation based on the attenuation factor.

18. A method as claimed in claim 17 wherein step ii) further includes calculating the attenuation factor based further on the noise level and a predetermined reference power level.

19. A method as claimed in claim 17 wherein step ii) further includes adjusting the variable attenuation based on a comparison of the power level of the intermediate optical signal and a power level of an output optical signal.

20. A method as claimed in claim 15 wherein the third step further includes:
   i) feeding the attenuator output signal to an optical power sub-amplifier having a pump power setting, controllable by the central control means, to produce the output signal;
   ii) determining the desired power level based on a program contained in the control means; and
   iii) adjusting the pump power level based on the desired power level.

* * * * *

UNITED STATES PATENT AND TRADEMARK OFFICE
CERTIFICATE OF CORRECTION

PATENT NO. : 6,215,584 B1
DATED : April 10, 2001
INVENTOR(S) : Yang et al.

It is certified that error appears in the above-identified patent and that said Letters Patent is hereby corrected as shown below:

<u>Column 12,</u>
Line 22, "outputs" should read -- output --

Signed and Sealed this

Fourth Day of June, 2002

Attest:

Attesting Officer

JAMES E. ROGAN
Director of the United States Patent and Trademark Office